(12) United States Patent
Nakanishi et al.

(10) Patent No.: US 10,475,547 B2
(45) Date of Patent: Nov. 12, 2019

(54) ALUMINUM-ALLOY SHEET FOR BUS BAR AND MANUFACTURING METHOD THEREOF

(71) Applicant: UACJ Corporation, Tokyo (JP)

(72) Inventors: Hidetaka Nakanishi, Aichi (JP); Mineo Asano, Aichi (JP)

(73) Assignee: UACJ CORPORATION, Tokyo (JP)

( * ) Notice: Subject to any disclaimer, the term of this patent is extended or adjusted under 35 U.S.C. 154(b) by 230 days.

(21) Appl. No.: 15/126,752

(22) PCT Filed: Apr. 8, 2015

(86) PCT No.: PCT/JP2015/060981
§ 371 (c)(1),
(2) Date: Sep. 16, 2016

(87) PCT Pub. No.: WO2015/156319
PCT Pub. Date: Oct. 15, 2015

(65) Prior Publication Data
US 2017/0092386 A1    Mar. 30, 2017

(30) Foreign Application Priority Data

Apr. 10, 2014  (JP) ................................. 2014-081332

(51) Int. Cl.
*H01B 1/02*       (2006.01)
*C22F 1/043*      (2006.01)
(Continued)

(52) U.S. Cl.
CPC ............. *H01B 1/023* (2013.01); *C22C 21/02* (2013.01); *C22C 21/08* (2013.01); *C22F 1/043* (2013.01);
(Continued)

(58) Field of Classification Search
CPC .......... C22C 21/02; C22F 1/043; C22F 1/047; C22F 1/05; H01B 1/023; H02G 5/00
See application file for complete search history.

(56) References Cited

U.S. PATENT DOCUMENTS 4,065,326 A * 12/1977 Nicoud .................. H01B 1/023
148/550
5,266,130 A    11/1993 Uchida et al.
(Continued)

FOREIGN PATENT DOCUMENTS

CA           2166615 C     7/2006
CN         102803530 A    11/2012
(Continued)

OTHER PUBLICATIONS

Office Action from the Chinese Patent Office dated Apr. 12, 2017 in related Chinese application No. 201580004701.5 and machine translation thereof.

(Continued)

*Primary Examiner* — Ngoc-Yen Nguyen
(74) *Attorney, Agent, or Firm* — J-Tek Law PLLC; Jeffrey D. Tekanic; Scott T. Wakeman

(57) ABSTRACT

An aluminum-alloy sheet for a bus bar has a chemical composition containing Mg: 0.3%-0.9% (mass %, likewise below), Si: 0.2%-1.2%, Cu: 0.2% or less, and Fe: 0.5% or less, the remainder being Al and unavoidable impurities. In addition, acicular particles containing Mg and Si are present in the Al matrix at 900-4,000 particles/$\mu m^2$. In addition, Fe-based particles present in the above-mentioned Al matrix have an average circle-equivalent diameter of 5 μm or less, and the number of particles having a circle-equivalent diameter of more than 2 μm is 10,000 particles/$mm^2$ or less.

20 Claims, 1 Drawing Sheet

(51) Int. Cl.
  *C22F 1/047* (2006.01)
  *C22C 21/02* (2006.01)
  *C22C 21/08* (2006.01)
  *H02G 5/00* (2006.01)
  *C22F 1/05* (2006.01)

(52) U.S. Cl.
  CPC ............... *C22F 1/047* (2013.01); *C22F 1/05* (2013.01); *H02G 5/00* (2013.01)

(56) References Cited

U.S. PATENT DOCUMENTS

| | | | |
|---|---|---|---|
| 5,525,169 | A | 6/1996 | Murtha |
| 5,919,323 | A | 7/1999 | Murtha |
| 6,129,792 | A | 10/2000 | Murtha |
| 8,500,473 | B2 | 8/2013 | Fujiwara et al. |
| 9,362,014 | B2 | 6/2016 | Nakanishi et al. |
| 2010/0071933 | A1* | 3/2010 | Otsuka ................ C21D 9/60 174/128.1 |
| 2010/0072584 | A1 | 3/2010 | Aruga et al. |
| 2011/0266029 | A1 | 11/2011 | Sekiya et al. |
| 2011/0272175 | A1 | 11/2011 | Sekiya et al. |
| 2012/0094553 | A1 | 4/2012 | Fujiwara et al. |
| 2012/0241193 | A1 | 9/2012 | Shinoda |
| 2012/0321889 | A1 | 12/2012 | Sekiya et al. |
| 2013/0269842 | A1 | 10/2013 | Seki et al. |
| 2013/0302676 | A1 | 11/2013 | Seki et al. |
| 2013/0323589 | A1 | 12/2013 | Yamaguchi et al. |
| 2014/0209350 | A1 | 7/2014 | Nakanishi et al. |
| 2015/0007910 | A1 | 1/2015 | Sekiya et al. |

FOREIGN PATENT DOCUMENTS

| | | | |
|---|---|---|---|
| EP | 2813592 | A1 | 12/2014 |
| JP | S61119659 | | 6/1986 |
| JP | H01255637 | | 10/1989 |
| JP | 2001003131 | A | 1/2001 |
| JP | 2004339559 | | 12/2004 |
| JP | 2005008926 | A | 1/2005 |
| JP | 2009041045 | A | 2/2009 |
| JP | 2009167464 | A | 7/2009 |
| JP | 2009238831 | | 10/2009 |
| JP | 2011019385 | A | 1/2011 |
| JP | 5330590 | B1 | 10/2013 |
| JP | 2014047372 | A | 3/2014 |
| JP | 2015034330 | A | 2/2015 |
| KR | 20060055602 | | 5/2006 |
| WO | 2013118734 | A1 | 8/2013 |
| WO | 2013147270 | A1 | 10/2013 |

OTHER PUBLICATIONS

Office Action from the Korean Patent Office dated Apr. 20, 2017 in related Korean application No. 10-2016-7030851, and machine translation thereof.

Extended European Search Report from the European Patent Office dated Oct. 23, 2017 in related EP application No. 15 777 267.4, including European Search Opinion, European Search Report, and examined claims 1-15.

Fischer F. et al., Einfluss der Mikrooberflaeche auf die Umformbarkeit von Aluminium-Karosseriewerkstoffen ("Effect of the microsurface on the deformability of aluminum-automobile body materials"), Aluminium, Aluminium Verlag, Dusseldorf, DE, vol. 56, No. 9, Jan. 1, 1980, pp. 578-584, XP009500542, ISSN: 0002-6689.

Office Action from the Chinese Patent Office dated Oct. 19, 2017 in related Chinese application No. 201580004701.5, and machine translation thereof.

Office Action from the Japanese Patent Office dated Dec. 26, 2017 in related Japanese application No. 2014-081332, and machine translation thereof.

Office Action from the Korean Patent Office dated Oct. 31, 2017 in related Korean application No. 10-2016-7030851, and machine translation thereof.

Panigrahi S K, et al. "Development of ultrafine grained Al—Mg—Si alloy with enhanced strength and ductility", Journal of Alloys and Compounds, Elsevier Sequoia, Lausanne, CH, vol. 470, No. 1-2, Feb. 20, 2009 (Feb. 20, 2009), pp. 285-288, XP025913144, ISSN: 0925-8388.

Office Action from the Chinese Patent Office dated Mar. 15, 2018 in related Chinese application No. 01580004701.5, and translation of substantive portions thereof.

English translation of International Preliminary Report on Patentability for parent application No. PCT/JP2015/060981, dated Jul. 7, 2015.

English translation of International Search Report dated Jul. 7, 2015 for parent application No. PCT/JP2015/060981.

* cited by examiner

# ALUMINUM-ALLOY SHEET FOR BUS BAR AND MANUFACTURING METHOD THEREOF

CROSS-REFERENCE

This application is the US national stage of International Patent Application No. PCT/JP2015/060981 filed on Apr. 8, 2015, which claims priority to Japanese Patent Application No. 2014-081332, filed on Apr. 10, 2014.

TECHNICAL FIELD

The present invention relates to an aluminum-alloy sheet for a bus bar and to a manufacturing method thereof.

BACKGROUND ART

Bus bars composed of pure-copper sheets having excellent electrical conductivity and strength, such as oxygen-free copper, tough-pitch copper, or oxygen-free phosphorus-containing copper, are used as conductive members for the wiring of power control units (PCUs) or the like in transportation machines, for example, the Shinkansen, linear motor cars, hybrid automobiles, and electrical vehicles. In addition, if strength greater than that of a pure-copper sheet is needed, then a bus bar or the like is used in which a copper-alloy sheet having high electrical conductivity is subjected to electrolytic nickel plating.

From the viewpoint of improving the energy efficiency of transportation machines, there has been a strong demand in recent years to reduce the weight of the component parts. However, among the metals used as electrically conductive members, there is a limit to the extent to which the weight of a bus bar that uses copper can be reduced, because copper has a relatively large specific gravity. In addition, there is a problem in that the material cost of copper is high.

As a counter measure for such problems, bus bars made of aluminum alloys, which have a lower cost and smaller specific gravity than copper, are being studied. JIS A 1060 material (Patent Document 1), which excels in electrical conductivity, JIS A 6101 material (Patent Document 2), which excels in strength, and the like have been proposed as examples of aluminum materials for bus bars.

CITATION LIST

Patent Citations

Patent Document 1
Japanese Laid-open Patent Publication 2011-19385
Patent Document 2
Japanese Laid-open Patent Publication 2009-238831

SUMMARY OF THE INVENTION

Usually, a bus bar is formed by bending a bar, a sheet material, or the like into a shape that conforms to a wiring space. Consequently, the aluminum material used as the raw material of the bus bar is required to have excellent bendability. However, it is difficult for a material having excellent bendability, such as, for example, a 1000-series aluminum material, to meet the strength properties required in a bus bar. Moreover, even though a material having high strength, such as, for example, a 6000-series aluminum material, can meet the requirements of strength—by performing a solution heat treatment, an artificial-aging treatment, and the like—and electrical conductivity, there is a problem in that bendability is low and cracks tend to occur.

The present invention was conceived considering this background, and an object of the present invention is to provide an aluminum-alloy sheet for a bus bar having high strength, high electrical conductivity, and excellent bendability, and to provide a manufacturing method thereof.

One aspect of the present invention is an aluminum-alloy sheet for a bus bar, comprising: a chemical composition containing Mg: 0.3%-0.9% (mass %, likewise below), Si: 0.2%-1.2%, Cu: 0.2% or less, and Fe: 0.5% or less, the remainder being Al and unavoidable impurities;

wherein acicular particles containing Mg and Si are present in the Al matrix at 900-4,000 particles/$\mu m^2$; and Fe-based particles present in the Al matrix have an average circle-equivalent diameter of 5 μm or less, and the number of particles having a circle-equivalent diameter of more than 2 μm is 10,000 particles/$mm^2$ or less.

Another aspect of the present invention is a method of manufacturing an aluminum-alloy sheet for a bus bar, comprising: preparing a sheet material having a chemical composition containing Mg: 0.3%-0.9% (mass %, likewise below), Si: 0.2%-1.2%, Cu: 0.2% or less, and Fe: 0.5% or less, the remainder being Al and unavoidable impurities;

subjecting the sheet material to a solution heat treatment;

subsequently subjecting the sheet material to a skin pass with a rolling reduction of 1%-10%; and subsequently subjecting the sheet material to an artificial-aging treatment.

The aluminum-alloy sheet for a bus bar (below, called an "aluminum-alloy sheet") has the above-specified chemical composition. Consequently, the aluminum-alloy sheet can relatively easily meet the strength properties and electrical conductivity required of a bus bar.

In addition, the acicular particles, which contain Mg and Si in the Al matrix, are necessarily included in the aluminum-alloy sheet, and the number of the acicular particles is kept within the above-specified range. Furthermore, if the Fe-based particles derived from Fe are included in the Al matrix, then the particle-size distribution of the Fe-based particles is kept within the above-specified range. Thus, in addition to the above-specified chemical composition, the aluminum-alloy sheet has a metallographic structure that is finely controlled as mentioned above, and thereby, as compared with a conventional 6000-series aluminum alloy sheet, tends not to crack during bending and has excellent bendability.

As described above, the aluminum-alloy sheet has high strength, high electrical conductivity, and excellent bendability.

In addition, the method of manufacturing an aluminum-alloy sheet includes a process in which the sheet material, which has been subjected to a solution heat treatment, is subjected to a skin pass with a rolling reduction in the above-specified range, after which the sheet material is subjected to an artificial-aging treatment. Thus, by performing the solution heat treatment, the skin pass, and the artificial-aging treatment in that order, the metallographic structure of the obtained aluminum-alloy sheet can be controlled to a desired state. As a result, the aluminum-alloy sheet having high strength, high electrical conductivity, and excelling in bendability can be easily manufactured.

DETAILED DESCRIPTION

Figure 1:
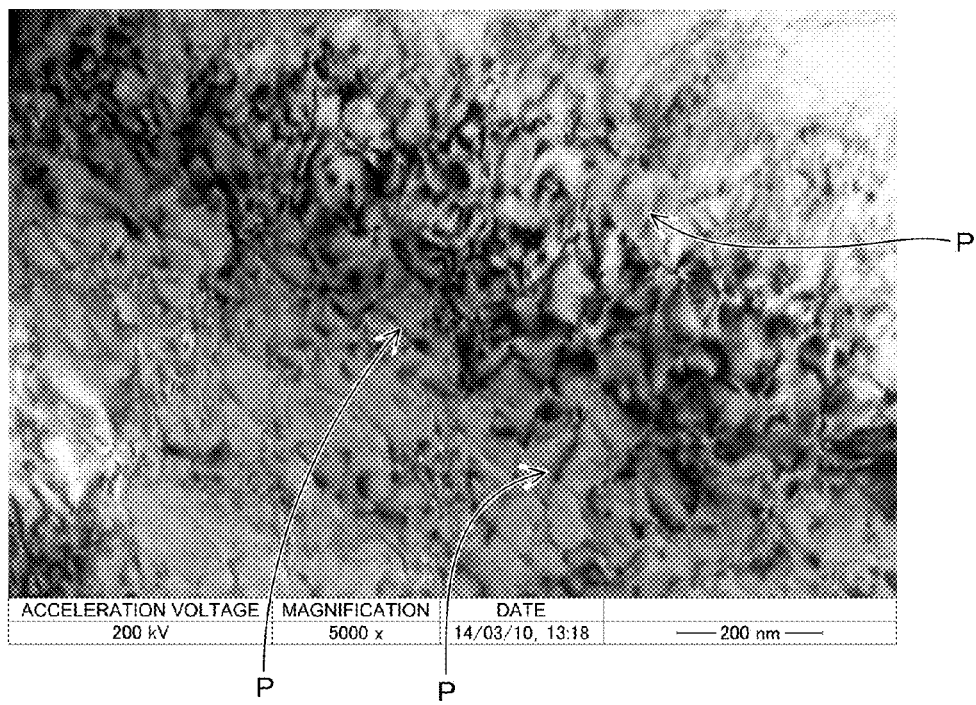
FIG. 1 is a photograph that shows an example of the metallographic structure of an aluminum-alloy sheet that, after undergoing a solution heat treatment, has undergone a skin pass and subsequently an artificial-aging treatment.

The above-mentioned aluminum-alloy sheet is explained below.

<Chemical Composition>

Mg: 0.3%-0.9%

Mg (magnesium) has an effect that, when it coexists with Si, acicular particles precipitate, and the strength of the aluminum-alloy sheet increases owing to precipitation strengthening. On the other hand, because Mg, which does not precipitate as acicular particles, solidifies in the Al matrix, if the amount of Mg solutes increases excessively, then the electrical conductivity tends to decrease.

By setting the Mg content to 0.3%-0.9%, the strength properties, electrical conductivity, and bendability of the aluminum-alloy sheet can be improved. From the same viewpoint, the Mg content is preferably set to 0.35%-0.85%. If the Mg content is less than 0.3%, then the number of acicular particles becomes excessively small and the strength of the aluminum-alloy sheet becomes low. On the other hand, if the Mg content is more than 0.9%, then the number of acicular particles becomes excessively large, and consequently bendability decreases and cracks tend to occur in the aluminum-alloy sheet. In addition, if the Mg content is more than 0.9%, then it is difficult to meet the electrical conductivity required of a bus bar.

Si: 0.2%-1.2%

Si (silicon) has an effect that, by coexisting with Mg, acicular particles precipitate and the strength of the aluminum-alloy sheet increases. By setting the Si content to the range of 0.2%-1.2%, the strength properties and the bendability of the aluminum-alloy sheet can be increased. From this same viewpoint, the Si content is preferably set to 0.25%-1.1%.

If the Si content is less than 0.2%, then the number of acicular particles becomes excessively small and the strength of the aluminum-alloy sheet becomes low. On the other hand, if the Si content is more than 1.2%, then the number of acicular particles becomes excessively large, the bendability decreases, and cracks tend to occur in the aluminum-alloy sheet.

Cu: 0.2% or Less

Cu (copper) may be intermixed to a certain extent depending on the type of raw material that is used. Cu has an effect that the formation of a shear band during bending is promoted. If a shear band exists, then microcracks that occur during bending will spread and enlarge the shear band, and cracks will tend to occur in the aluminum-alloy sheet. Therefore, if the Cu content becomes excessively large, it may lead to a decrease in bendability. In addition, if the Cu content becomes large, then there is a tendency for the electrical conductivity to decrease. Consequently, the problems discussed above are avoided by restricting the Cu content to 0.2% or less, and thereby the electrical conductivity and the bendability of the aluminum-alloy sheet can be increased. From the same viewpoint, the Cu content is preferably restricted to 0.1% or less.

Fe: 0.5% or Less

The same as with Cu, Fe (iron) may be intermixed to a certain extent depending on the type of raw material that is used. If the Fe content becomes large, then coarse Fe-based particles will tend to occur in the Al matrix. Because course Fe-based particles can become the origins of cracks during bending, if the Fe content becomes excessively large, then it will lead to a decrease in the bendability, and cracks will tend to occur in the aluminum-alloy sheet. Consequently, the problems described above are avoided by restricting the Fe content to 0.5% or less, and thereby the bendability of the aluminum-alloy sheet can be increased. From the same viewpoint, the Fe content is preferably restricted to 0.4% or less.

<Metallographic Structure>

Acicular Particles

Among the second-phase particles included in the Al matrix, the particles that contain Mg and Si and appear to be needle-shaped are called acicular particles. The acicular particles have an effect that they precipitate owing to an artificial-aging treatment and increase the strength of the aluminum-alloy sheet owing to precipitation strengthening. In addition, the greater the number of acicular particles that precipitate, the greater the relative reduction in the amount of Mg solutes in the Al matrix is; consequently, there is a tendency in which the greater the number of acicular particles is, the higher the electrical conductivity becomes. Therefore, by setting the number of acicular particles to 900 particles/$\mu m^2$ or more, the strength and the electrical conductivity of the aluminum-alloy sheet can be increased.

On the other hand, if the number of acicular particles becomes excessively large, it leads to a decrease in bendability, and cracks tend to occur in the aluminum-alloy sheet. From the viewpoint of avoiding such problems, the number of acicular particles is set to 4,000 particles/$\mu m^2$ or less. Accordingly, by keeping the number of acicular particles in a range of 900-4,000 particles/$\mu m^2$, the strength properties, the electrical conductivity, and the bendability of the aluminum-alloy sheet can be increased. Furthermore, precipitates, crystallized products, etc. that contain Mg and Si and exhibit a shape other than acicular may be included in the Al matrix; however, these precipitates, etc. do not have the effect that the strength properties, the electrical conductivity, and the bendability of the aluminum-alloy sheet increases.

Fe-Based Particles

Among the second-phase particles included in the Al matrix, the particles composed of Al—Fe—Si-based and Al—Fe-based crystallized products, precipitates, etc. are called Fe-based particles. Fe-based particles are formed in cases in which Fe is included in the aluminum-alloy sheet. If coarse Fe-based particles exist in the Al matrix, they may become the origins of cracks during bending, thereby leading to a decrease in bendability. Accordingly, to obtain an aluminum-alloy sheet that excels in bendability, the average circle-equivalent diameter of the Fe-based particles is kept to 5 $\mu m$ or less, and the number of particles having a circle-equivalent diameter of more than 2 $\mu m$ is kept to 10,000 particles/$mm^2$ or less. It is noted that it is also possible to compose the aluminum-alloy sheet such that it does not contain Fe-based particles by a method of, for example, making the chemical composition such that it does not contain Fe. Even if Fe-based particles are not present in the Al matrix, the strength properties, the electrical conductivity, and the bendability of the aluminum-alloy sheet do not decrease.

<Electrical Conductivity and Tensile Strength>

The aluminum-alloy sheet preferably has a tensile strength of 170 MPa or higher and an electrical conductivity of 55% IACS or higher. An aluminum-alloy sheet having such characteristics sufficiently meets the strength properties and electrical conductivity required of a bus bar, and consequently is suited to be a raw material of a bus bar.

Next, a method of manufacturing the aluminum-alloy sheet will be explained in detail.

First, a sheet material having the above-specified chemical composition is prepared. The preparing process and conditions of the sheet material are not particularly limited; however, usually, the sheet material can be prepared by sequentially performing a homogenization treatment and hot rolling on an ingot, and, after hot rolling, cold rolling may be supplemented as needed. The heating temperature during the homogenization treatment is preferably appropriately selected from the range of, for example, 450° C.-580° C. In addition, hot rolling is preferably performed such that, for example, rolling is started while the temperature of the sheet material is 400° C.-550° C. and the temperature when the rolling ends is 200° C.-350° C. If cold rolling is performed after the hot rolling, then the rolling can be started while the temperature of the sheet material is lower than 200° C. The rolling reduction in the cold rolling preferably utilizes conditions such that the crystal grains do not become coarser in the solution heat treatment.

Subsequently, the solution heat treatment is performed on the sheet material. In the solution heat treatment, first, the sheet material is heated until it reaches a prescribed temperature. The temperature reached by the sheet material at this time is preferably set to within the range of 480° C.-600° C. After the sheet material has reached the prescribed temperature, the heating may be immediately terminated or the heating may be terminated after holding the sheet material at the prescribed temperature for a fixed time. If the temperature of the sheet material is held, then the hold time is preferably set to 5 min or less.

After the solution heat treatment, the sheet material is subjected to a skin pass with a rolling reduction of 1%-10%. By performing a skin pass with a rolling reduction in the above-specified range, the bendability of the resulting aluminum-alloy sheet can be increased. This is because of the reasons below.

Usually, acicular particles tend to precipitate finely and with high density within crystal grains during the artificial-aging treatment. Furthermore, owing to the acicular particles being distributed at a high density, the formation of shear bands is promoted as the bending process is proceeds, and therefore cracks tend to occur during the bending. On the other hand, if the skin pass is performed on the sheet material, then the acicular particles preferentially precipitate at dislocations introduced by the skin pass, and consequently the density of the acicular particles can be reduced more than in the case in which the skin pass is not performed. As a result, bendability is improved and the occurrence of cracks can be reduced.

If the rolling reduction of the skin pass is less than 1%, then the introduction of the dislocations described above becomes insufficient and the density of the acicular particles becomes excessively high, and consequently bendability decreases. On the other hand, if the rolling reduction is more than 10%, then the amount of work hardening becomes excessively large, and consequently bendability decreases and cracks tend to occur in the aluminum-alloy sheet. Accordingly, from the viewpoint of improving bendability while avoiding excessive work hardening, the rolling reduction is set to 1%-10%. From the same viewpoint, the rolling reduction is preferably set to 1.5%-9%.

After the skin pass, an artificial-aging treatment is performed on the sheet material. The treatment conditions of the artificial-aging treatment should be conditions in which the above-specified metallographic structure is obtained, and are preferably conditions in which, in addition to the above-specified metallographic structure, tensile strength and electrical conductivity in the above-specified ranges are obtained. Specifically, the treatment conditions below can be used. First, the sheet material is heated until it reaches a prescribed temperature. The temperature reached by the sheet material at this time is preferably set to within the range of 160° C.-210° C. After the sheet material has reached the prescribed temperature, the heating may be terminated immediately, or the heating may be terminated after the sheet material has been held at the prescribed temperature for a fixed time. If the temperature of the sheet material is held, then the hold time is preferably set to 30 hours or less.

WORKING EXAMPLES

Working Example 1

Working examples of the above-mentioned aluminum-alloy sheet are explained below. In the present example, aluminum-alloy rolled sheets (Samples 1-13) having the chemical compositions (Alloys A-M) shown in Table 1 were manufactured, and they were evaluated with respect to tensile strength, electrical conductivity, and bendability.

Manufacture of the samples was performed based on the procedure below. First, ingots having a thickness of 500 mm and a width of 500 mm and having the chemical compositions shown in Table 1 were prepared using DC casting. After the resulting ingots were heated at 550° C. for 12 hours and subjected to a homogenization treatment, coarse-rolled sheets having a thickness of 6.0 mm were prepared by hot rolling. It is noted that the temperature of the ingots at the start of hot rolling was set to 550° C. In addition, the temperature of the coarse-rolled sheets at the end of hot rolling was 350° C. Subsequently, cold rolling was performed on the coarse-rolled sheets to prepare sheet materials having a thickness of 2.1 mm.

Next, the sheet materials were heated and subjected to a solution heat treatment. The temperature reached by the sheet materials in the solution heat treatment was set to 550° C., and the hold time after 550° C. was reached was set to 1 min. After the solution heat treatment, a skin pass was performed with a rolling reduction of 5% to make the thickness of the sheet materials 2.0 mm. Subsequently, the sheet materials were heated and subjected to an artificial-aging treatment. The temperature reached by the sheet materials in the artificial-aging treatment was set to 170° C., and the hold time after 170° C. was reached was set to 8 hours. The aluminum-alloy sheets (Samples 1-13) were obtained by the above.

Using the resulting samples, metallographic structure observations, tensile tests, electrical-conductivity measurements, and 180° contact-bending tests were performed. The details of each test are explained below.

<Metallographic Structure Observation>

Evaluation of the Number of Acicular Particles

Thin-piece samples parallel to the sheet surface were collected from the center parts of the samples in the thickness direction. Electron micrographs were obtained using a transmission electron microscope to observe the thin-piece samples at a magnification of 50,000×. Image analysis was performed on the resulting electron micrographs, and the number of acicular particles present in the visual field was measured. Furthermore, the number of acicular particles per unit of area (particles/μm$^2$) was calculated by dividing the number of acicular particles by the surface area of the visual field. It is noted that, although the above-mentioned technique is common as a method of observing fine second-phase particles, it is difficult to measure the particle size of the acicular particles based on the above-mentioned technique.

Figure 2:
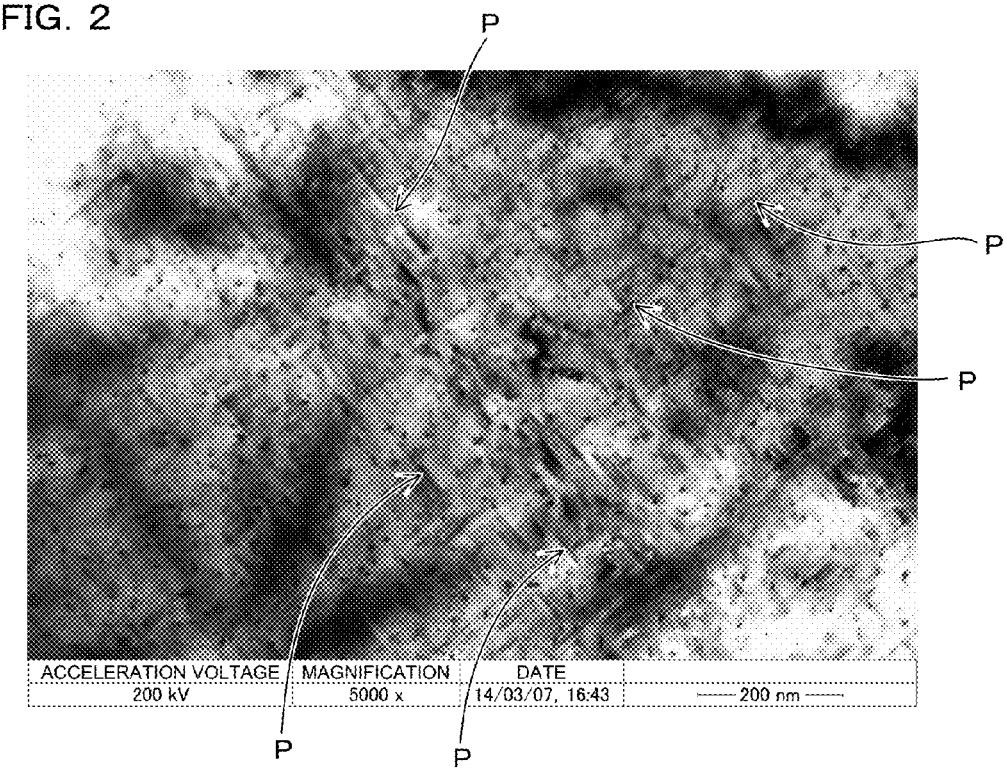
FIG. 2 is a photograph that shows an example of the metallographic structure of an aluminum-alloy sheet that, after undergoing a solution heat treatment, has undergone an artificial-aging treatment without undergoing a skin pass.

FIG. 1 and FIG. 2 show examples of electron micrographs. FIG. 1 is an electron micrograph of an aluminum-alloy sheet composed of an aluminum alloy containing Mg: 0.6% and Si: 0.5%, and on which a solution heat treatment was performed, after which a skin pass was performed with a rolling reduction of 9%, and subsequently an artificial-aging treatment was additionally performed. FIG. 2 is an electron micrograph of an aluminum-alloy sheet in which, in the description above, the solution heat treatment was performed and then the artificial-aging treatment was performed without performing a skin pass. In both FIG. 1 and FIG. 2, the presence of acicular particles (symbols P), extending in the diagonal direction of the figure, in the Al matrix can be confirmed. In addition, it can be understood that the number of acicular particles present in the visual field for the aluminum-alloy sheet on which a skin pass was performed (FIG. 1) is fewer than for the aluminum-alloy sheet on which a skin pass was not performed (FIG. 2).

Evaluation of Particle-Size Distribution of Fe-Based Particles

A section parallel to the sheet surface was exposed at a central part of each sample in the thickness direction. An electron micrograph was obtained using a scanning electron microscope to observe the section at a magnification of 500×. Image analysis was performed on the resulting electron micrograph, and a frequency distribution was prepared by calculating the circle-equivalent diameter of the Fe-based particles present in the visual field. Furthermore, based on the frequency distribution, the average circle-equivalent diameter of the Fe-based particles and the number of Fe-based particles having a circle-equivalent diameter more than 2 µm were calculated.

<Tensile Test>

The tensile strength of each sample was measured by performing a tensile test in accordance with the test method stipulated in JIS Z 2241. Furthermore, test pieces for the tensile test were collected such that the longitudinal direction and the rolling direction were parallel. In addition, in the tensile test, a sample having a tensile strength of 170 MPa or higher was judged to be acceptable.

<Electrical-Conductivity Measurement>

The electrical conductivity of each sample was measured at 25° C. using an electrical-conductivity measuring instrument ("SIGMATEST® 2.069" made by Foerster Co.). Furthermore, in the electrical-conductivity measurement, a sample having an electrical conductivity of 55% IACS or higher was judged to be acceptable.

<180° Contact-Bending Test>

The 180° contact-bending test was performed using a strip material collected from each sample in accordance with the test method stipulated in JIS Z 2248, and the presence of cracks after the test was confirmed visually. Furthermore, the 180° contact-bending test was performed such that the inner-side bend radius at the time of preliminary bending reached 2.0 mm. In addition, in the 180° contact-bending test, samples in which there were no cracks after the test were judged to be acceptable.

Table 2 shows the results of each evaluation. It is noted that evaluation entries that were not judged to be acceptable are underlined in Table 2.

TABLE 1

| | Chemical Composition (mass %) | | | | |
|---|---|---|---|---|---|
| | Mg | Si | Cu | Fe | Al |
| Alloy A | 0.63 | 0.43 | 0.05 | 0.32 | Bal. |
| Alloy B | 0.31 | 0.35 | 0.03 | 0.25 | Bal. |
| Alloy C | 0.89 | 0.39 | 0.10 | 0.15 | Bal. |
| Alloy D | 0.58 | 0.23 | 0.04 | 0.20 | Bal. |
| Alloy E | 0.65 | 1.20 | 0.01 | 0.22 | Bal. |
| Alloy F | 0.72 | 0.48 | 0.19 | 0.13 | Bal. |
| Alloy G | 0.53 | 0.75 | 0.06 | 0.48 | Bal. |
| Alloy H | 0.18 | 0.65 | 0.02 | 0.33 | Bal. |
| Alloy I | 1.00 | 0.77 | <0.01 | 0.15 | Bal. |
| Alloy J | 0.58 | 0.12 | 0.03 | 0.26 | Bal. |
| Alloy K | 0.82 | 1.30 | 0.04 | 0.30 | Bal. |
| Alloy L | 0.66 | 0.54 | 0.33 | 0.11 | Bal. |
| Alloy M | 0.63 | 0.55 | 0.06 | 0.63 | Bal. |

TABLE 2

| | | Metallographic Structure Observations | | | | | |
|---|---|---|---|---|---|---|---|
| | | | Fe-Based Particles | | | Electrical- | 180° |
| | Alloy Used | Acicular Particles Density (particles/ µm$^2$) | Average Circle-Equivalent Diameter (µm) | Density (particles/ mm$^2$) | Tensile Test Tensile Strength (MPa) | Conductivity Measurement Electrical Conductivity (% IACS) | Contact-Bending Test Presence of Cracks |
| Sample 1 | Alloy A | 3265 | 4.9 | 6432 | 215 | 57 | None |
| Sample 2 | Alloy B | 1647 | 4.1 | 5061 | 198 | 59 | None |
| Sample 3 | Alloy C | 3902 | 3.2 | 3087 | 221 | 55 | None |
| Sample 4 | Alloy D | 2396 | 4.0 | 4024 | 201 | 59 | None |
| Sample 5 | Alloy E | 3356 | 4.1 | 4491 | 225 | 55 | None |
| Sample 6 | Alloy F | 3615 | 3.3 | 2656 | 220 | 55 | None |
| Sample 7 | Alloy G | 2708 | 5.0 | 9648 | 212 | 57 | None |
| Sample 8 | Alloy H | 886 | 4.2 | 6635 | 165 | 57 | None |
| Sample 9 | Alloy I | 5093 | 3.0 | 3067 | 230 | 52 | Present |
| Sample 10 | Alloy J | 845 | 2.4 | 2414 | 162 | 57 | None |
| Sample 11 | Alloy K | 4188 | 4.7 | 6008 | 233 | 56 | Present |
| Sample 12 | Alloy L | 3334 | 2.1 | 2286 | 225 | 49 | Present |
| Sample 13 | Alloy M | 3282 | 6.5 | 11093 | 220 | 56 | Present |

As can be understood from Table 1 and Table 2, Samples 1-7 have the above-specified chemical compositions (Alloys A-G) and have the above-specified metallographic structures. Consequently, Samples 1-7 each exhibited excellent tensile strength, electrical conductivity, and bendability. Each of Samples 1-7 satisfied the characteristics required of a bus bar and is satisfactory as a bus bar raw material.

Because Sample 8 used Alloy H, which has a low Mg content, the number of acicular particles was excessively small. As a result, it was judged to be unacceptable in the tensile test.

Because Sample 9 used Alloy I, which has a high Mg content, the number of acicular particles was excessively large. As a result, it was judged to be unacceptable in the 180° contact-bending test. In addition, because the Mg content was high, it was judged to be unacceptable in the electrical-conductivity measurement.

Because Sample 10 used Alloy J, which has a low Si content, the number of acicular particles was excessively small. As a result, it was judged to be unacceptable in the tensile test.

Because Sample 11 used Alloy K, which has a high Si content, the number of acicular particles was excessively large. As a result, it was judged to be unacceptable in the 180° contact-bending test.

Because Sample 12 used Alloy L, which has a high Cu content, it was judged to be unacceptable in the electrical-conductivity measurement and the 180° contact-bending test.

Because Sample 13 used Alloy M, which has an Fe content of more than 0.5%, the number of coarse Fe-based particles was excessively large. As a result, it was judged to be unacceptable in the 180° contact-bending test.

Working Example 2

The present example is an example of aluminum-alloy sheets that were manufactured by varying the rolling reduction when performing the skin pass. In the present example, first, ingots having a chemical composition containing Mg: 0.65%, Si: 0.40%, Cu: 0.02%, and Fe: 0.25%, the remainder being Al and unavoidable impurities, and having the dimensions of a thickness of 500 mm and a width of 500 mm, were manufactured by DC casting. After the resulting ingots were heated for 10 hours at 560° C. and subjected to a homogenization treatment, hot rolling was performed and coarse-rolled sheets having a thickness of 4.0 mm were manufactured. It is noted that the temperature of the ingots when hot rolling was started was set to 560° C. In addition, the temperature of the coarse-rolled sheets at the end of hot rolling was 330° C. Subsequently, cold rolling was performed with the rolling reductions shown in Table 3 and sheet materials were prepared.

Subsequently, the sheet materials were heated and then subjected to solution heat treatment. The temperature reached by the sheet materials in the solution heat treatment was set to 560° C., and the hold time after 560° C. was reached was set to 30 seconds. After the solution heat treatment, skin passes were performed with the rolling reductions shown in Table 3 to make the thickness of the sheet materials 2.0 mm. Subsequently, the sheet materials were heated and subjected to an artificial-aging treatment. The temperature reached by the sheet materials in the artificial-aging treatment was set to 180° C., and the hold time after 180° C. was reached was set to 6 hours. The aluminum-alloy sheets (Samples 21-25) were obtained by the above.

Using the resulting samples, various evaluations were performed, as in Working Example 1. The results thereof are shown in Table 4. Furthermore, evaluation entries that were not judged to be acceptable are underlined in Table 4.

TABLE 3

| | Cold-Rolling of Coarse-Rolled Plates | | Skin Pass | |
| --- | --- | --- | --- | --- |
| | Rolling Reduction (%) | Finished Plate Thickness (mm) | Rolling Reduction (%) | Finished Plate Thickness (mm) |
| Sample 21 | 49.5 | 2.02 | 1.0 | 2.00 |
| Sample 22 | 47.3 | 2.11 | 5.2 | 2.00 |
| Sample 23 | 44.5 | 2.22 | 9.9 | 2.00 |
| Sample 24 | 50.0 | 2.00 | 0.0 | 2.00 |
| Sample 25 | 42.5 | 2.30 | 13.0 | 2.00 |

TABLE 4

| | Metallographic Structure Observation | | | | | |
| --- | --- | --- | --- | --- | --- | --- |
| | | Fe-Based Particles | | | Electrical- | 180° |
| | Acicular Particles Density (particles/ μm²) | Average Circle-Equivalent Diameter (μm) | Density (particles/ mm²) | Tensile Test Tensile Strength (MPa) | Conductivity Measurement Electrical Conductivity (% IACS) | Contact-Bending Test Presence of Cracks |
| Sample 21 | 3954 | 4.9 | 6562 | 205 | 55 | None |
| Sample 22 | 3282 | 4.5 | 6823 | 213 | 56 | None |
| Sample 23 | 2689 | 4.7 | 6389 | 220 | 57 | None |
| Sample 24 | 4164 | 4.6 | 6755 | 203 | 57 | Present |
| Sample 25 | 2285 | 4.8 | 6488 | 226 | 58 | Present |

As can be understood from Table 3 and Table 4, because Samples 21-23 were subjected to the skin pass with the rolling reductions in the above-specified range, they exhibited excellent characteristics for tensile strength, electrical conductivity and bendability. Samples 21-23 satisfied the characteristics required of a bus bar and are satisfactory as bus bar raw materials.

On the other hand, in Sample 24, because the rolling reduction in the skin pass was less than 1%, Sample 24 was judged to be unacceptable in the 180° contact-bending test.

In Sample 25, because the rolling reduction in the skin pass was more than 10%, the amount of work hardening became excessively large and Sample 25 was judged to be unacceptable in the 180° contact-bending test.

The invention claimed is:

1. An aluminum-alloy sheet for a bus bar produced by a process comprising:
preparing a sheet material having a chemical composition containing Mg: 0.3%-0.9% (mass %, likewise below), Si: 0.2%-1.2%, Cu: 0.2% or less, and Fe: 0.5% or less, the remainder being Al and unavoidable impurities;
subjecting the sheet material to a solution heat treatment;
subsequently subjecting the sheet material to a skin pass with a rolling reduction of 1%-10%; and
subsequently subjecting the sheet material to an artificial-aging treatment;
wherein:
acicular particles containing Mg and Si are present in the Al matrix at 900-4,000 particles/$\mu m^2$; and
Fe-based particles present in the Al matrix have an average circle-equivalent diameter of 5 μm or less, and the number of particles having a circle-equivalent diameter of more than 2 μm is 10,000 particles/mm$^2$ or less.

2. The aluminum-alloy sheet according to claim 1, wherein the aluminum-alloy sheet has a tensile strength of 170 MPa or higher and an electrical conductivity of 55% IACS or higher.

3. A method of manufacturing an aluminum-alloy sheet, comprising:
preparing a sheet material having a chemical composition containing Mg: 0.3%-0.9% (mass %, likewise below), Si: 0.2%-1.2%, Cu: 0.2% or less, and Fe: 0.5% or less, the remainder being Al and unavoidable impurities;
subjecting the sheet material to a solution heat treatment;
subsequently subjecting the sheet material to a skin pass with a rolling reduction of 1%-10%; and
subsequently subjecting the sheet material to an artificial-aging treatment,
wherein after the artificial-aging treatment:
acicular particles containing Mg and Si are present in the Al matrix of the aluminum-alloy sheet at 900-4,000 particles/$\mu m^2$; and
Fe-based particles present in the Al matrix of the aluminum-alloy sheet have an average circle-equivalent diameter of 5 μm or less, and the number of particles having a circle-equivalent diameter of more than 2 μm is 10,000 particles/mm$^2$ or less.

4. The method according to claim 3, wherein the solution heat treatment is performed at 480° C.-600° C.

5. The method according to claim 3, wherein the rolling reduction is 1.5%-9%.

6. The method according to claim 3, wherein the artificial-aging treatment is performed at 160° C.-210° C.

7. The method according to claim 3, wherein the chemical composition contains 0.35%-0.85% Mg.

8. The method according to claim 3, wherein the chemical composition contains 0.25%-1.1% Si.

9. The method according to claim 3, wherein the chemical composition contains 0.1% or less Cu.

10. The method according to claim 3, wherein the chemical composition contains 0.4% or less Fe.

11. The method according to claim 10, wherein the chemical composition contains 0.35%-0.85% Mg, 0.25%-1.1% Si and 0.1% or less Cu.

12. The method according to claim 11, wherein the solution heat treatment is performed at 480° C.-600° C., the rolling reduction is 1.5%-9% and the artificial-aging treatment is performed at 160° C.-210° C.

13. The method according to claim 12, wherein the chemical composition contains 0.65% Mg, 0.40% Si, 0.02% Cu, and 0.25% Fe, the remainder being Al and unavoidable impurities.

14. The aluminum-alloy sheet according to claim 1, wherein the chemical composition contains 0.35%-0.85% Mg.

15. The aluminum-alloy sheet according to claim 1, wherein the chemical composition contains 0.25%-1.1% Si.

16. The aluminum-alloy sheet according to claim 1, wherein the chemical composition contains 0.1% or less Cu.

17. The aluminum-alloy sheet according to claim 1, wherein the chemical composition contains 0.4% or less Fe.

18. The aluminum-alloy sheet according to claim 1, wherein the chemical composition consists of 0.35%-0.85% Mg, 0.25%-1.1% Si, 0.4% or less Fe, and 0.1% or less Cu, the remainder being Al and unavoidable impurities.

19. The aluminum-alloy sheet according to claim 1, wherein the chemical composition consists of 0.65% Mg, 0.40% Si, 0.02% Cu, and 0.25% Fe, the remainder being Al and unavoidable impurities.

20. A bus bar formed with the aluminum-alloy sheet according to claim 1.

* * * * *